United States Patent [19]

Wallace et al.

[11] 4,073,059
[45] Feb. 14, 1978

[54] HOOK STYLE PRUNING SHEAR

[75] Inventors: Edward Morris Wallace, Longmeadow; Robert George Gosselin, Springfield, both of Mass.

[73] Assignee: Wallace Mfg. Corporation, Enfield, Conn.

[21] Appl. No.: 718,827

[22] Filed: Aug. 30, 1976

[51] Int. Cl.² .............................................. B26B 13/16
[52] U.S. Cl. ......................................... 30/261; 30/262
[58] Field of Search .......................... 30/261, 262, 271

[56] References Cited

U.S. PATENT DOCUMENTS

| 2,574,354 | 11/1951 | Smith | 30/262 X |
| 2,650,423 | 9/1953 | Phillips | 30/261 |
| 2,715,270 | 8/1955 | Oxhandler | 30/262 |
| 2,821,018 | 1/1958 | Schwieso | 30/271 X |

FOREIGN PATENT DOCUMENTS

| 1,208,605 | 9/1959 | France | 30/271 |
| 1,224,555 | 9/1966 | Germany | 30/271 |

Primary Examiner—Jimmy C. Peters
Attorney, Agent, or Firm—Ross, Ross & Flavin

[57] ABSTRACT

A pruning shear of the hook style or pass-by type wherein the crossed levers are pivoted in combination with a power element for absorbing the impact generated upon the completion of the severing function as the shear is moving in shear closing direction. The shear has a cutting blade, a hook type blade, a yoke shaped upper handle straddling the two blades, a lower handle integral with the cutting blade, a leaf spring biasing the two handles to opened position, and a power element wherein a contained or restricted force producing material of rubber or like elastomeric form is deformable as a damping mechanism for absorbing the impact as momentarily sustained when the work engaged between the blades is finally and fully severed.

6 Claims, 4 Drawing Figures

HOOK STYLE PRUNING SHEAR

The invention is disclosed as embodied in a pruning shear and similar tools utilizing crossed pivoted levers and comprehends broadly the combination of a cutting blade, a hook type blade, a yoke shaped upper handle straddling the two blades, a lower handle being unitary with the cutting blade, a leaf spring for biasing the two handles to opened position, and a cooperant bumper for damping the closing stroke. A locking mechanism for locking the handles in the closed position may also be provided.

Relative movement of the handles controls concomitant movement of the blades between opened and closed positions. As used herein, "movement of handles" is a term used in the relative sense meaning that one handle moves with respect to the other. In a real sense, the upper handle hereof may be said not to move and only the lower handle may be said to move, all on the reasoning that the upper handle, in operational use, is stationarily held by the palm of the hand while the lower handle is moved theretoward in shear-closing direction and is moved therefrom in shear-opening direction.

Primarily, the concern of the invention is in the provision of a power element of the type which is operated by pressure changes of a pressure-producing material, same incorporated into a design and located in a situs such as has never before been found in a shear of the yoke type.

The power or force-transmitting element, sometimes called the bumper, may be formed as a single piece or in a plurality of pieces from a thermoplastic such as rubber or similar elastomeric material to define a self-reforming impact-absorbing structure which may be compressed and having sufficient memory as to be substantially self-reforming upon release from its confined or restricted position of compression.

Preferentially, the power element is held in a concealed position relative to the top and side walls of the shear upper handle so as to be free of operator contact and free of becoming fouled by exterior objects during operational use.

Such situs offers the advantage that the power element is contained or restricted within a relatively confined area cooperating with the upper top wall of the lower handle — upper cutting blade combination on each shear-closing stroke so as to provide the damping function, the power element being compressed by such motion wherefore the mass is squeezed between the walls of the upper handle and the top wall of the lower handle-upper cutting blade combination and the compressive force generated being stored therewithin until the shear is next returned to opened position.

The power element or bumper acts on the principle of stored force, in that when the shear is returned to opened position following a cutting or closing stroke or upon being released from locked-closed position, an initial thrust is generated, resultant from the stored energy inherent in the bumper in compressed state, and aids the shear-opening function.

Energy of momentum in shear-closing is captured and placed into storage where it is held, without depletion until the next following shear-opening when the energy of momentum is released serving initially to thrust the blades and handles into shear-opened position.

By being concealed, the bumper offers no interference with the shear operation and no opportunity for any pinching of the operator's hand. Further, it is inexpensive in its cost and readily replaceable so as to make it attractive from both cost and maintenance points of view. It is easily and securely assembled without any requirement for rivets, fasteners or like auxiliary means which only add to production costs.

To further facilitate shear use, a leaf spring is generally employed to bias the blades to the opened position, same being contained within one of the handles for the avoidance of interference with its operation as well as interference with exterior objects which the tool may encounter.

As the blades must be protected against damage, and as the users of such devices must be protected against injury from the blades, a locking mechanism has been incorporated into the construction to maintain the blades in positions where they are least susceptible to damage and least likely to cause injury to persons, that is in the blades-closed position. Hence, the locking mechanism must function against the action of the biasing spring which tends to urge the blades to opened position.

When the locking mechanism is moved to unlocking position, it is desirable that it reliably remain in that position, so that the shear can be operatively manipulated in as facile a manner as possible. For example, if the lock were to move from unlocking to locking position while the shear is in use, it would obviously interfere with the desired operation.

The lock must be desirably located where it can be readily manipulated even when only one hand of the operator is available as when holding onto a ladder or grasping the branches being pruned, and even while the operator is grasping the shear. Such a location provides the greatest degree of protection both to the shear and to the user thereof, since the shear may be moved in locked position to the place where it is to be used, then unlocked, manipulated in operative fashion, and then, immediately and without difficulty, locked in closed position, even though the user may have had but one hand available throughout.

Desirably, the parts involved should be as simple and sturdy as possible, not only from the point of view of minimizing costs, but also from the point of view of maximizing reliability and sturdiness. The fewer the parts in a given construction, the easier is its manufacture and assemblage and the less likely is it to sustain breakage or damage. To these ends, this invention is directed.

These and other objects and advantages of this invention will become apparent from the following description when taken in connection with the accompanying drawings, wherein.

Figure 1:
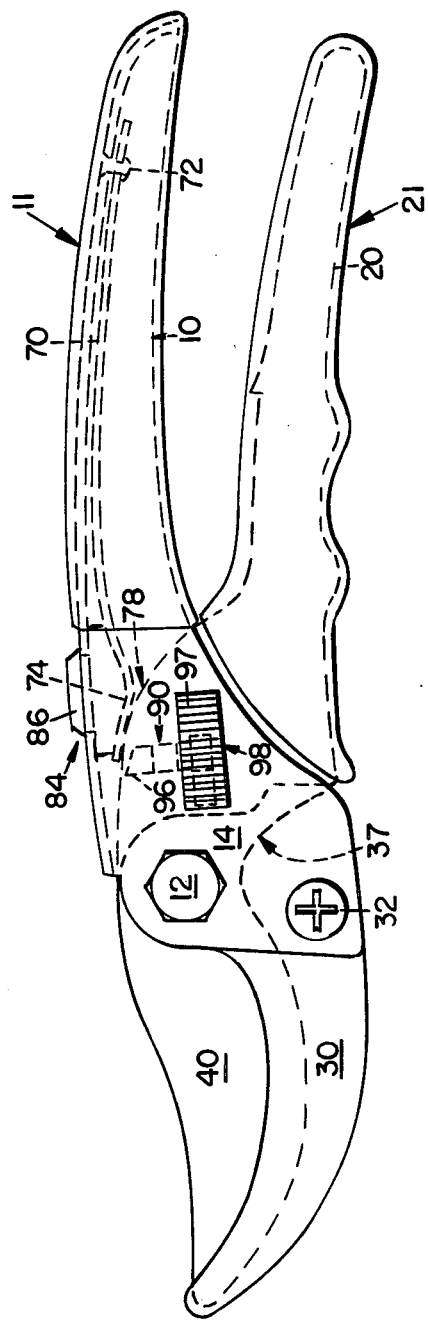
FIG. 1 is a view in side elevation of the pruner incorporating the invention.
Figure 4:
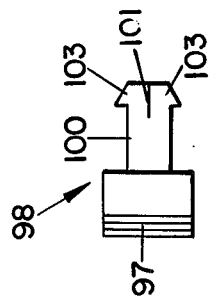
FIG. 4 is an enlarged view in side elevation of the lock element of the locking mechanism.

In the drawings, there is illustrated a crossed lever type of tool in the form of a pass-by shear which includes a pair of handles, an upper handle 10 and a lower handle 20, pivotally joined as by a pivot bolt 12. The handles can be covered by the usual rubber or plastic covering members 11 and 21 respectively.

Upper handle 10 is configured to define the usual top wall 10A and side walls 10B and at its inboard end is provided with a yoke 14 between the spaced opposite cheeks of which lower handle 20 is extendable.

The yoke cheeks are further disposed on opposite sides of a lower hook blade 30 and an adjacent confronting upper cutting blade 40 in the usual manner.

Upper blade 40 and lower handle 20 are unitary.

Hook blade 30 is in pivotal relationship with upper cutting blade 40 as by pivot bolt 12 extendable transversely through the opposite yoke cheeks and through hook blade 30 and upper blade 40, the pivot bolt being held secure relative to its supported components by a conventional pivot nut 16 threadedly engaged therewith.

Pivot bolt 12, extended through the suitably-aligned apertures 52 in the yoke, 54 in the hook blade, and 56 in the cutting blade, defines a fulcrum.

A hook blade screw 32 is extendable through suitably-aligned hook blade screw aperture 62 of one cheek of the yoke and hook blade screw aperture 64 of the hook blade.

Hook blade bushing 34 is extendable through the aligned hook blade bushing aperture (not shown) in the other cheek of the yoke.

A hook blade spacing collar and stop 36 is sleeved on hook blade bushing 34 between the hook blade and cheek of the yoke distantly thereof to allow a space for the vertical movement of upper cutting blade 40 relative to the hook blade and, additional to its spacing function, to serve as a stop for the opened position of the shear, the curvilinear lower face 37 of handle 20 coming to rest on the spacing collar and stop in a bearing relationship.

Relative pivotal movement, between upper cutting blade 40 and its integral lower handle 20 on the one hand and hook blade 30 and upper handle 10 fixedly secured thereto on the other hand, is allowed by pivot bolt 12 as the handles are moved toward and away from each other.

To improve shear versatility, there has been further provided spring actuated biasing means which is preset so as to bias the cutting members to opened position. A leaf spring 70 is concealed within the upper handle and secured at its outer extremity to the inside wall of the upper handle by a leaf spring rivet 72 and is configured at its inboard extremity with a terminal portion 74 preferentially having a generally upwardly-facing slightly curvilinear geometry for bearing downwardly upon and riding upwardly and downwardly along the upper curvilinear shoulder or spine 78 of the upper cutting blade.

As lower handle 20 is brought upwardly relative to upper handle 10 by the pressure of the operator's hand, terminal portion 74 is caused to ride forwardly and upwardly along the curvilinear shoulder or spine 78.

In the hook or pass-by type of pruning shear, more than ordinary effort is expended in the cutting operation, it being necessary to build up a relatively greater amount of momentum as one goes from shears opened to shears closed position when there is work being performed. More importantly, there is an unpleasant sudden impact sustained between the moment when the cutting action is completed and the next following moment when the shears are finally moved to the fully closed position. To absorb such sudden shock is the primary desideratum of the invention.

The power element or bumper 84 is suitably related to the inside wall portions of the upper handle as to be held securely relative thereto. This may be by means of a suitable adhesive between the components or by some cagelike or pocketlike arrangement or detents or lances by which one member, the bumper, may be held relative to the other member, the upper handle, without affecting the compressive function.

As shown, one exemplary system for interrelating these components, although by no means the only system, comprehends that upper wall 10A of upper handle 10 will be suitably slotted as at 82 for nesting therewithin an upper neck 86 of bumper 84, same being held secure relative to the upper handle by the tight fit of the neck 86 in the slot. The major portion of the bumper will be observed to extend downwardly and having a lowermost face embraceable with the curvilinear terminal portion 74 of the leaf spring. The bumper is thereby securely locked in situ.

By locating the bumper forwardly relative to the free end of the spring, the curvature of the spring accommodates in a cradling manner to the lower confronting face of the bumper so as to help to lock the bumper in situ and to locate it more positively relative to the top wall or spine of the upper blade.

Preferentially, the bumper is formed of a neoprene or other suitable shock absorbing material to provide the requisite damping function but also to be easily and securely assembled without any requirement for rivets, fasteners or like auxiliary means which only add to production costs.

The bumper may be formed of one piece or it may comprise a plurality of pieces. It is illustrated as comprising a one piece member.

The damping feature is best realized during an actual cutting operation — there being no real need for damping otherwise — where, at the completion of the cutting operation, a sudden impact is experienced as the shear then hurriedly proceeds to shear-closed position.

The damping function is to absorb that impact so that the feel of operation is not only more pleasant but also less harmful to the operator.

The bumper action is enhanced by the fact that the leaf spring serves as an interface between bumper and cutting blade minimizing friction and wear in the shear-closing action and helping to absorb some of the shock of impact.

The salient feature is that the bumper is held between the cheeks of the yoke and the top wall of the upper handle and the spine of the upper cutting blade so as to be compressed in the ever diminishing area therewithin defined as the lower handle is brought upwardly toward the upper handle.

Just as hook blade spacing collar and stop 36 functions as a stop for the shears-opened position, bumper 84 functions as a stop for the shears-closed position.

With prior art devices, the shear-closed stop defines a metal to metal contact of the handles whereas in the instant application, the resilient material of the bumper precludes the metal-to-metal contact situation.

Additional to the bumper, a locking mechanism is provided comprised of a blade lock stud or position-fixing element 90 comprised of a generally rectangular member, of any suitable rugged plastic or metal having a transversely extending nose 92 projecting outwardly of one side thereof, the nose being nestably receivable for a tight fit with a suitable lock stud opening 94 extending transversely through the cutting blade.

The lock mechanism further includes a knurled manually engageable operator 97 of a lock element 98 from which extends centrally thereof an integral nose 100 split as at 101 at its outer end and extendable through a lock slot 102 in one cheek of the yoke so that the lock mechanism may be slidable in fore and aft directions as determined by the length of the slot.

The split end 101 is provided with detents 103 which engage the inside wall of the cheek on opposite sides of the lock slot 102.

The locked rearward position is achieved by the passage of nose 100 beneath the lower or bottom edge of the blade lock stud 90 so as to preclude downward movement of the lower handle under the biasing force of the leaf spring and with an unlocked forward position being achieved by the passage of nose 100 forwardly and clear of blade lock stud 90, thus to allow downward movement of the lower handle under the biasing force of the leaf spring.

Figure 2:
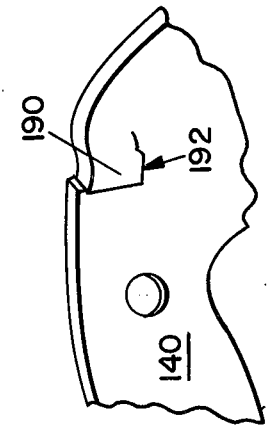
FIG. 2 is a fragmentary view in side elevation of the central top portion of the cutting blade showing an alternate locking system.
Figure 3:
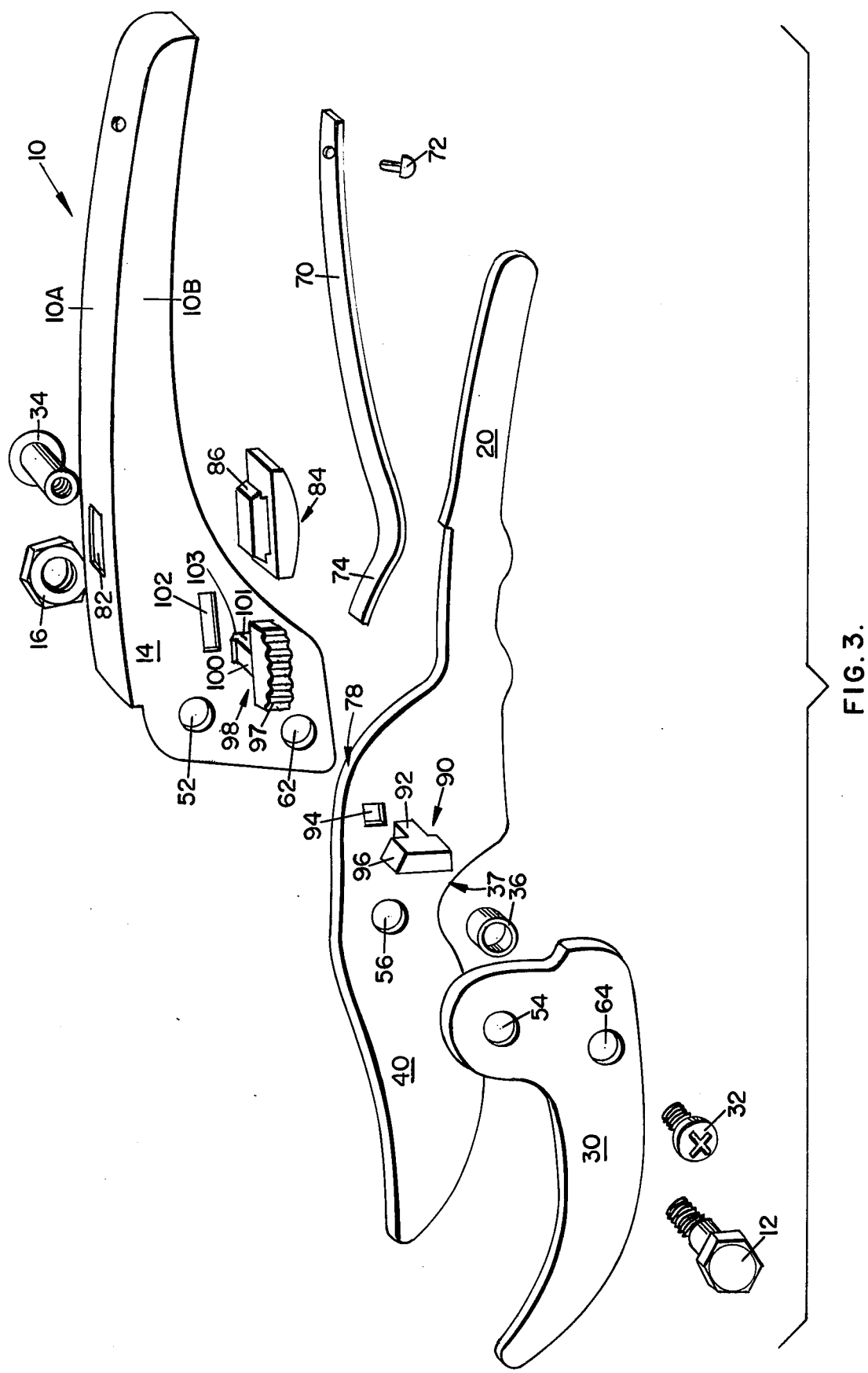
FIG. 3 is an exploded isometric view of the components of the FIG. 1 pruner.

Alternately, and as shown in FIG. 2, the use of the blade lock stud or position-fixing element 90 can be eliminated in the case of a cutter blade 140.

In such case, a lance 190 may be provided in the side wall of the cutting blade so as to define an outwardly projecting lower surface 192 under which the nose of the lock element may be extended by the sliding movement of the latter. When the nose is thus interengaged, the locking function is operational. When disengaged, the unlocking function is operational.

I claim:

1. A pass-by type pruning shear comprising:
a cutting blade,
a holding blade,
a yoke shaped upper handle straddling the blades,
a lower handle unitary with the cutting blade,
interengaging means between handles and blades,
a cantilever type spring pinned to the upper handle at one extremity for biasing the upper and lower handles to opened position, and a power element mounted within and entirely concealed by the geometry of the upper handle in all operating positions and having a bearing relationship with the upper handle and cutting blade and spring for damping the impact of completion of a cutting function.

2. In the pass-by pruning shear of claim 1 including:
a locking mechanism consisting of a slidable element located in the cheek of the yoke of the upper handle and a cooperant lock element, with the slidable element being slidable between a cutting blade-holding blade locked position of interengagement with the lock element and a cutting blade-holding blade unlocked position of disengagement with the lock element.

3. In a pass-by shear according to claim 1 including:
locking mechanism including a locking element mounted on a side face of the upper handle for sliding movements between shears locked and shears unlocked positions and having a nose extendable through the upper handle toward the confronting upper blade and a position-fixing element concealed within the upper handle and held relative to the upper blade with the nose of the locking element being shiftable under and into locking engagement with the position-fixing element for retaining the handles and blades in closed positions and being shiftable away therefrom for releasing the handles and blades to opened positions.

4. A pruning shear of the pass-by type comprising:
a cutting blade,
a hook blade,
an upper handle straddling the cutting blade and hook blade,
a lower handle unitary with the cutting blade,
a leaf spring for biasing the upper and lower handles to opened position and having an outboard end fixed to the outboard end of the upper handle and a free inboard end, and
a power element mounted relative to the upper handle for damping the shear closing stroke and having a bearing relationship with the upper handle and upper blade and leaf spring.

5. A pruning shear of the pass-by type comprising:
a cutting blade,
a holding blade,
an upper handle straddling the blades, and being generally U-shaped channel yoke in cross section to define spaced opposite cheeks,
a lower handle unitary with the cutting blade,
interengaging means between handles and blades facilitating movement of blades and handles between shear-opened and shear-closed positions,
cantilever type spring wholly concealed between the cheeks and within the channel of the upper handle and having an outboard terminal fixed to the upper handle and a free inboard terminal disposed below the upper handle with a bearing relationship within the cutting blade for biasing the upper and lower handles to opened position, and
a resilient power element mounted relative to the upper handle and concealed entirely within the channel and between the cheeks of the upper handle and having a bearing relationship with the upper handle and cutting blade and spring for compression between the upper handle and cutting blade and spring for damping the impact as the shear moves to shear closed position following completion of the cutting function.

6. A pruning shear of the pass-by type comprising:
a cutting blade,
a holding blade,
an upper handle straddling the blades,
a lower handle unitary with the cutting blade,
pivot means between handles and blades,
a cantilever type spring biasing the upper and lower handles to opened position and having an outboard end secured to the upper handle and a free inboard end bearing upon the cutting blade, and
an impact-absorbing member formed of a thermoplastic material and being mounted relative to the upper handle and having a bearing relationship with the upper handle and cutting blade and spring for damping the impact as the shear is driven in a by-pass manner to fully-closed position upon completion of the cutting function and having a memory sufficient for self-reforming upon release from its confined position in the fully-closed position.

* * * * *